Dec. 29, 1942.  A. KURTI  2,306,958
FRONT WHEEL DRIVE
Filed Dec. 5, 1941  2 Sheets-Sheet 1

INVENTOR.
ALADAR KURTI
BY
ATTORNEY.

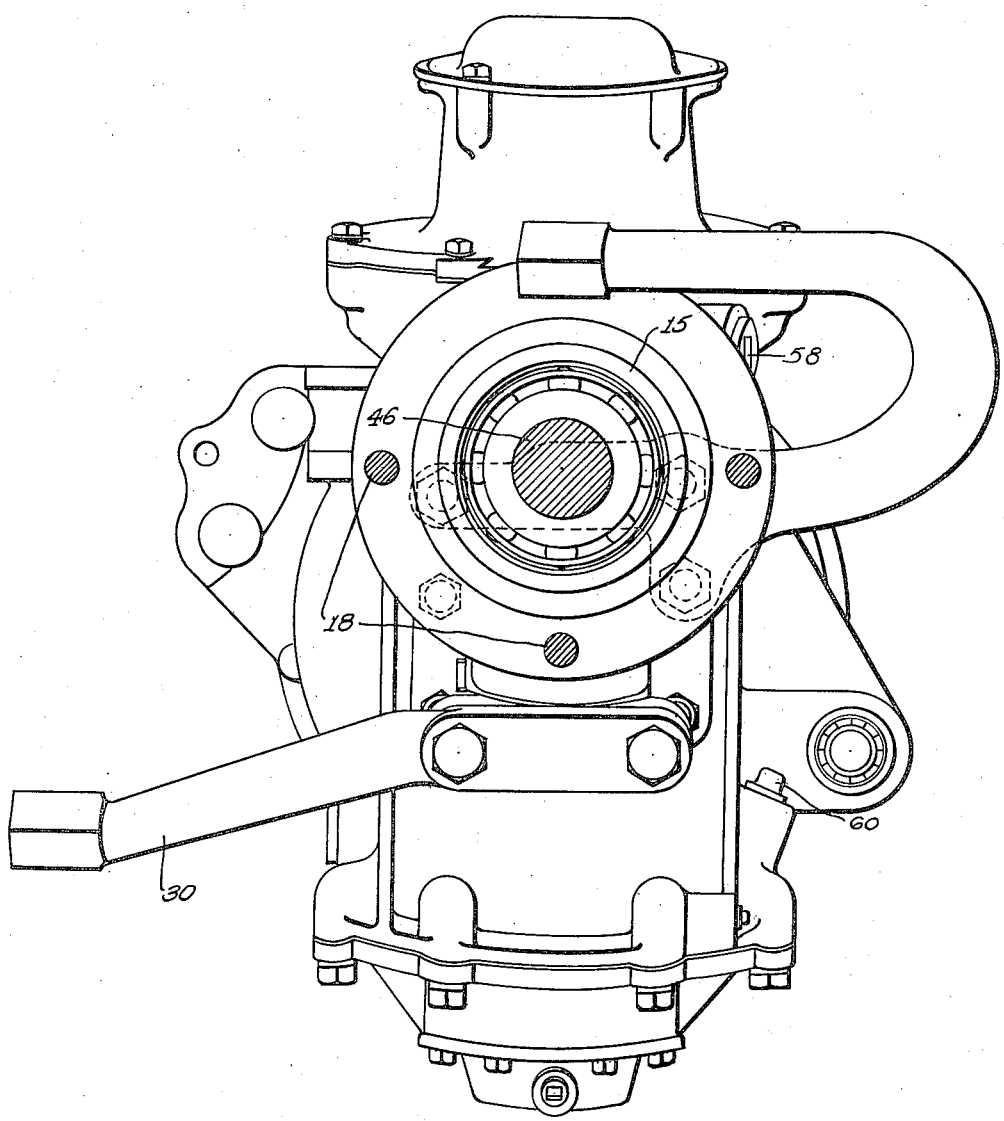

Patented Dec. 29, 1942

2,306,958

UNITED STATES PATENT OFFICE 2,306,958

FRONT WHEEL DRIVE

Aladar Kurti, Highland Park, N. J., assignor to Mack Manufacturing Corporation, Long Island City, N. Y., a corporation of Delaware Application December 5, 1941, Serial No. 421,717

11 Claims. (Cl. 74—386)

The present invention relates to drive mechanisms for dirigible vehicle wheels and embodies, more specifically, an improved form of wheel mounting for front or steering wheels of motor vehicles in which driving forces may be transmitted to the wheels by a highly serviceable and efficient mechanism.

Many forms of drive mechanisms for front or steering wheels of vehicles have been designed and used in practice but difficulties have always arisen in connection with the manufacture and service thereof because of the nature of the driving mechanism and the stresses to which it is subjected during service. The present invention has for an object the provision of a front or steering wheel mounting for motor vehicles which is so designed and constructed that driving forces may be transmitted to the wheel without impairing its steering functions and yet, in such fashion, that the driving forces are effectively carried by the wheel mounting and so that the supporting and journalling elements thereof may be formed of sufficient strength to carry the stresses to which they are subjected without requiring objectionably heavy and complicated structures.

A further object of the invention is to provide in a front wheel driving mechanism of the type above referred to, a steering wheel mounting structure having a king pin formed to serve either as a driving element or as a housing therefor, the pin, at the same time, serving effectively as a means for supporting the wheel spindle for steering movement in the manner now commonly employed.

A further object of the invention is to provide front wheel drive mechanisms having housings for the driving elements which are capable of retaining fluid lubricant in sufficient quantity to adequately lubricate the gears and bearings.

A further object of the invention is to provide front wheel drive mechanisms having housings for the movable elements thereof which are sealed to prevent the entrance of water or foreign matter.

A further object of the invention is to provide compact front wheel drive mechanisms in which the driving elements are relieved of the weight of the vehicle and in which misalignment of the gears by the driving stresses is minimized.

Further objects of the invention will be apparent as it is described in greater detail in connection with the accompanying drawings, wherein:

Fig. 2 is a view in end elevation, looking from the right-hand end of the drawing of Fig. 1 and showing the steering and tie rod arms.

Figure 1:
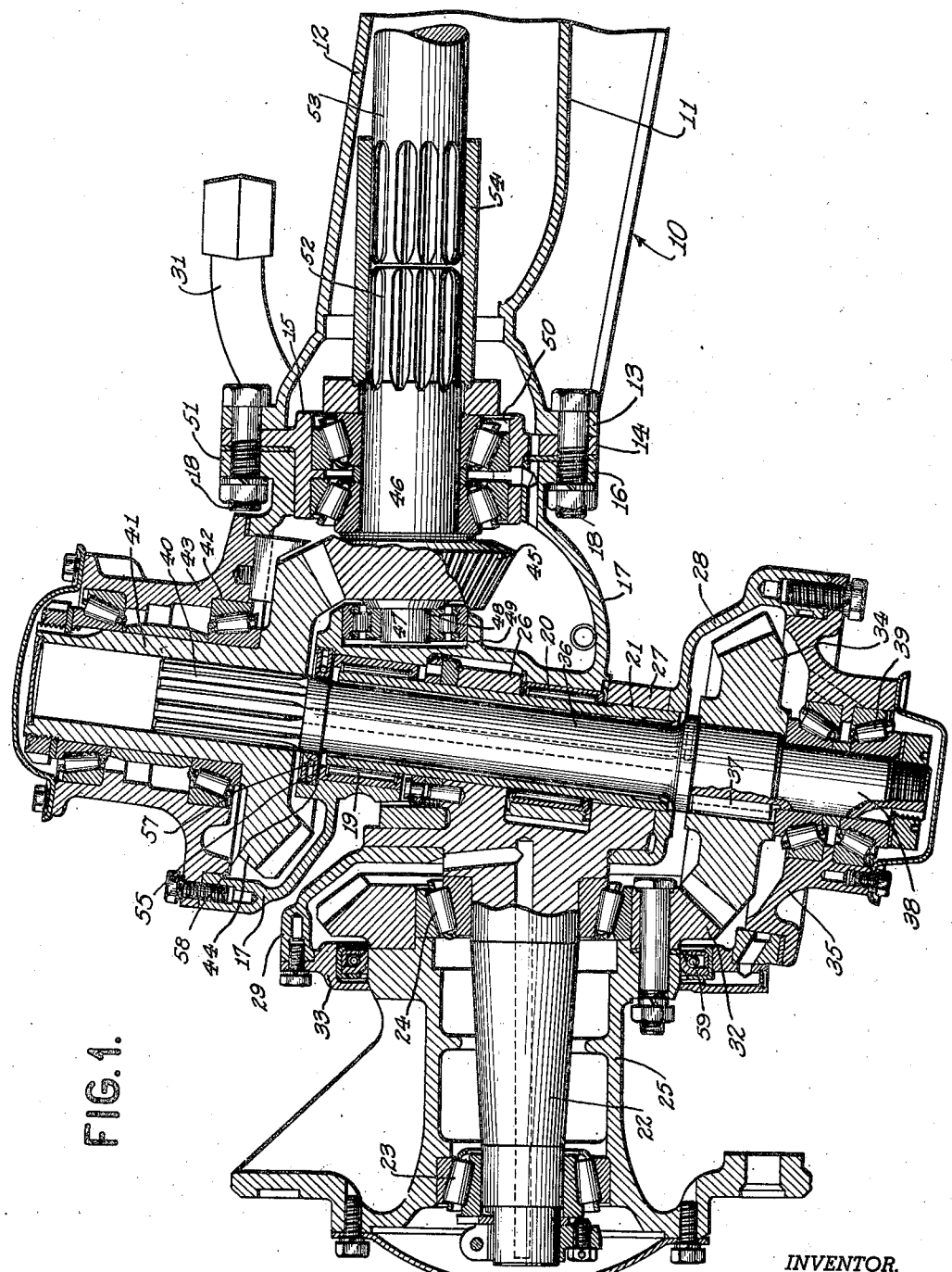
Fig. 1 is a view in vertical section, taken on a plane passing through the axis of the driving jack-shaft for the steering wheel.

Referring to the above drawings and particularly to Fig. 1, a front axle of the vehicle is illustrated at 10 and is provided with a housing 11 that drops somewhat in the central portion thereof as indicated by the sloping top surface 12 in Fig. 1. The ends of the axle are flanged at 13 to receive a flange 14 carried by bearing housing 15 which is secured in the position shown in Fig. 1 between the flange 13 and a flange 16 formed on a knuckle housing 17. Bolts 18 secure the flanges 13, 14 and 16 in the position illustrated and maintain the housings in the desired assembled relationship.

The knuckle housing 17 is formed with spaced apart bearings 19 and 20 within which is journalled a king pin 21 which, in the form shown, is a hollow shaft.

A wheel spindle 22 is provided with spaced bearings 23 and 24, upon which a wheel hub 25 is journalled. The spindle 22 is also provided with spaced apart portions 26 and 27 which are formed with eyes receiving the king pin 21. The bearing 20 is received between the portions 26 and 27 and the above described structure thus serves as a means for mounting effectively the wheel on the front axle in order to support forces in a vertical direction.

The spindle 22 is provided with housings 28 and 29 which are rigidly secured thereto and form an integral part thereof. A steering arm 31 (Fig. 2) may be secured directly to the housing 28 in order to impart steering forces to the front wheel in the usual manner. In like fashion, a tie rod arm 30 may also be connected to the housing structure in order that the steering movements may be transmitted to the wheel at the other end of the axle 10.

In order that driving forces may be applied to the wheel hub 25, the hub has secured thereto a bevel gear 32 which is received within the housing 29 and enclosed by a housing cover 33. Driving the gear 32 is a bevel gear 34 which is received within the housing 28 and enclosed by a cover 35 at the lower extremity of the housing.

A drive shaft 36 is received within the hollow king pin 21 and is keyed at 37 to the driving gear 34. The lower end of the shaft is formed with a reduced portion 38 that is mounted in suitable bearings 39 which not only journal the shaft in the cover 35 but also serve as a step bearing for the mechanism.

The upper end of the shaft 36 is splined at 40 to a sleeve 41 that is journalled at 42 within a cover 43 for the housing 17. The sleeve 41 is formed with a bevel gear 44 that is driven by a driving bevel pinion 45, formed upon a stub shaft 46. The shaft 46 is formed with a reduced extremity 47 that is journalled at 48 within a hollow boss 49, formed on the knuckle 17. Stub shaft 46 is journalled at 50 in a cylindrical extension 51 of the knuckle housing 17, the end of the stub shaft 46 being splined as illustrated at 52. A driving jack shaft 53 is coupled to the stub shaft 46 by means of a splined coupling sleeve 54, the axis of the shaft 53 being above the axis of the housing 11 in order to drop the sprung weight of the vehicle as far as possible.

From the foregoing, it will be seen that the driving forces from shaft 53 are transmitted through the coupling 54 to the stub shaft 46. The bearings 48 and 50 enable the stub shaft 46 to carry effectively the driving forces to which it is subjected and to transmit them through the bevel drive pinion 45 to the bevel gear 44 and drive shaft 36. The driving forces are transmitted to the wheel hub 25 through bevel driving gear 34 and bevel gear 32. In this fashion, the steering wheel is driven by mechanism that is free of substantially all stresses except those which serve to drive the wheel.

It will be seen that the housing 17 enclosing the gears 44 and 45 is rigidly fixed to the axle 10. The housing 28 and 29 which may be referred to as the spindle housing, encloses the gears 32 and 34 and is pivotally movable in relation to the housing 17 about the axis of the king pin 21.

An oil seal 55 comprising a leather washer 56 and a contracting spring 57, retains lubricant in the housing 17 up to the level of the filling plug 58 (Fig. 2). Another oil seal 59 is disposed between the housing cover 33 and the wheel hub 25 and acts to prevent escape of lubricant from the housings 28 and 29. The level of the lubricant in this housing is maintained up to the filler plug 60 (Fig. 2). The oil seals 55 and 59 also act to prevent the entry of dirt into the housing, thereby minimizing wear on the gears.

The use of a tubular king pin 21 permits the shaft 36 to extend through the spaced apart portions 26 and 27 of the spindle and the bearing portions 20 and further permits these bearing portions to be located between the upper and lower pairs of gears, thereby resulting in a compact construction of a height less than the diameter of the wheel or brake drum, not shown. Moreover, by mounting the shaft 36 in a bearing 39 in the spindle housing 35, and supporting the opposite end of the shaft in the gear 44, the shaft 36 is relieved of bending stresses caused by the weight of the vehicle and is so supported that deflection of the shaft through reaction of the gears is entirely avoided, thereby preventing misalignment of the gears and reducing wear thereon.

While the invention has been described with reference to the specific structure shown in the drawings, it is not to be limited save as defined in the appended claims.

I claim:

1. Steering wheel driving mechanism comprising a steering wheel hub having a gear secured thereto, a spindle journalling the hub for rotation, a tubular king pin supporting the spindle for turning movements, an axle housing mounting the king pin, a drive shaft in the axle housing, a bevel gear driven by the drive shaft, a shaft section in the king pin, a driven bevel gear non-rotatably connected to one end of the shaft section, said driven gear being journaled on said axle housing and in mesh with the drive shaft bevel gear and a second gear on the other end of the shaft section meshing with the first named gear.

2. Steering wheel driving mechanism comprising a steering wheel hub having a gear secured thereto, a spindle journalling the hub for rotation, a king pin mounting the spindle for turning movements, an axle, a housing on said axle mounting the king pin, a drive shaft, a bevel gear in said housing driven by the drive shaft, a shaft section in the king pin, a driven bevel gear journaled in said housing, splined to one end of the shaft section and meshing with the drive shaft bevel gear, a second gear on the other end of the shaft section meshing with the first named gear, and means supported by said spindle for journaling the opposite end of said shaft section.

3. Steering wheel driving mechanism comprising a steering wheel hub having a gear secured thereto, a spindle journalling the hub for rotation, a tubular king pin mounting the spindle for turning movements, an axle housing, a drive shaft in the axle housing, a bevel gear driven by the drive shaft, a shaft section floating in the king pin, a driven bevel gear splined to one end of the shaft section and meshing with the drive shaft bevel gear, a second gear on the other end of the shaft section meshing with the first named gear, a knuckle housing secured to the axle housing, means to journal the king pin on the knuckle housing, and means to journal the driven bevel gear in the knuckle housing.

4. Steering wheel driving mechanism comprising a steering wheel hub having a gear secured thereto, a spindle journalling the hub for rotation, a tubular king pin mounting the spindle for turning movements, an axle housing, a drive shaft in the axle housing, a bevel gear driven by the drive shaft, a shaft section in and rotatable relatively to the king pin, a driven bevel gear splined to the upper end of the shaft section above the axis of the drive shaft bevel gear and meshing with the drive shaft bevel gear, a second bevel gear at the lower end of the shaft section and below the first named gear, meshing with the first named gear, a knuckle housing secured to the axle housing enclosing the drive and driven bevel gears, means to journal the king pin on the knuckle housing, means to journal the driven bevel gear in the knuckle housing, a spindle housing on said spindle enclosing said first named gear and said second bevel gear, and a bearing for the lower end of said shaft section in said spindle housing below said second bevel gear.

5. Steering wheel driving mechanism comprising a steering wheel hub having a gear secured thereto, a spindle journalling the hub for rotation, a king pin mounting the spindle for turning movements, an axle housing, a drive shaft in the axle housing, a knuckle housing secured to the axle housing having means for receiving the king pin, a stub shaft driven by the drive shaft, a gear on the stub shaft, means to transmit power from the last named gear to the first named gear, and means on opposite sides of the gear on the stub shaft to journal the said stub shaft in the knuckle housing.

6. A steering wheel driving mechanism comprising a steering wheel hub having a gear secured thereto, a spindle journaling the wheel hub for rotation, a tubular king pin mounting the spindle for turning movements, a spindle housing attached to the spindle and enclosing said gear, a knuckle housing supporting the king pin, a driving gear in, and a driven gear journaled in the knuckle housing, a shaft splined in the driven gear and journaled in the spindle housing, said shaft extending through the king pin, and a gear mounted on the shaft in the spindle housing and engaging the gear on the wheel hub.

7. A steering wheel driving mechanism comprising a steering wheel hub having a gear thereon, a spindle rotatably supporting said hub, an axle, a knuckle housing on said axle having means for receiving a king pin, a spindle housing on said spindle enclosing said gear, a tubular king pin mounted in said means between said knuckle and spindle housings and supporting said spindle for turning movements, a second gear journaled in said knuckle housing coaxial with said king pin, a shaft within said king pin having one end journaled in said spindle housing and the other end splined to said bevel gear, a third gear fixed on said shaft in said spindle housing and meshing with the gear on said hub, and a gear in said knuckle housing meshing with said second gear.

8. A steering wheel driving mechanism comprising an axle, a knuckle housing on said axle having spaced apart means thereon for receiving a king pin, a tubular king pin mounted in said means, a spindle having spaced apart portions straddling one of said means for receiving said king pin, a wheel hub mounted rotatably on said spindle having a gear thereon, a housing on said spindle enclosing said gear and having a portion extending beneath said king pin, a shaft within said king pin having one end journaled in said housing portion, a second gear on said shaft meshing with said hub gear, a third gear journaled in said knuckle housing receiving non-rotatably the upper end of said shaft and constituting the support for the upper end of said shaft, and means for driving said third gear.

9. A steering wheel driving mechanism comprising an axle, a knuckle housing on said axle having a bearing portion on one side thereof and a laterally projecting portion above said bearing portion, a wheel spindle having spaced apart portions straddling said bearing portion and a gear housing extending in part beneath said spaced apart portions, a tubular king pin extending through said bearing and spaced apart portions supporting said spindle for pivotal movement, a wheel hub rotatably mounted on said spindle, a gear on said hub disposed within said spindle housing, a drive gear rotatably mounted in said knuckle housing, a driven gear having a hub portion journaled in the laterally projecting portion of said knuckle housing in alignment with said king pin, a bearing in said spindle housing in alignment with said king pin, a shaft within said king pin supported by said driven gear and said bearing and non-rotatably connected to said driven gear, and a gear fixed to said shaft within said spindle housing meshing with the gear on said wheel hub.

10. A steering wheel driving mechanism comprising a steering wheel hub having a gear secured thereto, a spindle journaling the wheel hub for rotation, a tubular king pin mounting the spindle for turning movements, a spindle housing attached to the spindle and enclosing the gear, a knuckle housing supporting the king pin, a driving gear in, and driven gear journaled in the knuckle housing, a shaft splined in the driven gear and journaled in the spindle housing, said shaft extending through the king pin, a gear mounted on the shaft in the spindle housing and engaging the gear on the wheel hub, and sealing means to maintain oil in and exclude dirt from the knuckle and spindle housings.

11. A steering wheel driving mechanism comprising a steering wheel hub having a gear secured thereto, a spindle supporting the wheel hub for rotation, said spindle having spaced apart portions for receiving a king pin, a spindle housing attached to the spindle and enclosing the gear, a knuckle housing having spaced apart bearing portions adapted to receive therebetween one of said spaced apart portions of the spindle, a tubular king pin rigidly secured in the spindle and journaled in said bearing portions, a driving gear in, and driven gear journaled in the knuckle housing, a drive shaft freely splined at one end in the driven gear and extending through the king pin to the spindle housing and a driving gear mounted on the drive shaft and engaging the gear on the hub.

ALADAR KURTI.